WILLIAM McKEEVER.
Improvement in Churns.
No. 126,560.  Patented May 7, 1872.
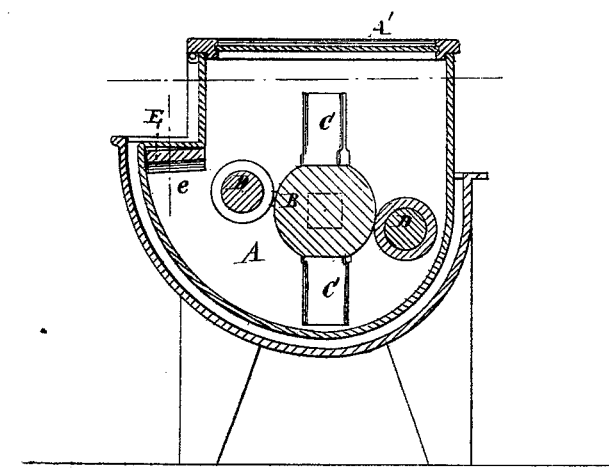
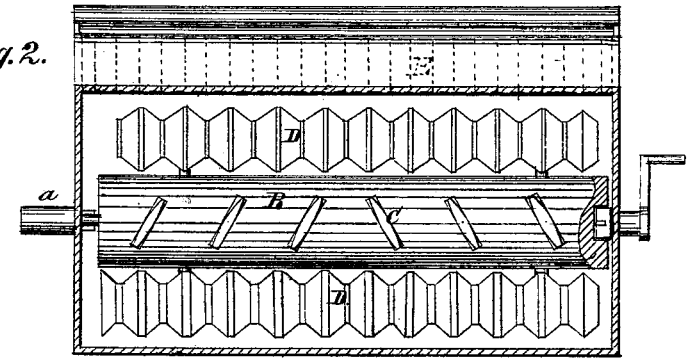
Witnesses:  
G. Matthys.  
Thos. D. D. Durand
Inventor:  
Wm. McKeever  
Per _____  
Attorneys.

UNITED STATES PATENT OFFICE.

WILLIAM McKEEVER, OF STAUNTON, VIRGINIA, ASSIGNOR TO HIMSELF AND G. A. SCHOPPERT, OF SAME PLACE.

IMPROVEMENT IN CHURNS.

Specification forming part of Letters Patent No. 126,560, dated May 7, 1872.

Specification describing a new Churn and Butter-Worker, invented by WILLIAM MC-KEEVER, of Staunton, in the county of Augusta and State of Virginia.

The invention will first be described, in connection with all that is necessary to a full understanding thereof, and then clearly pointed out in the claim.

Figure 1 is a cross-section, Fig. 2 is a horizontal section, and Fig. 3 is a detached section, of the stationary breaker.

A represents the cream-chamber, having cover A' and outlet $a$; B, a rotary shaft, detachably journaled thereon; C, paddles, placed on and obliquely to the shaft; and D, breakers, rigidly attached to said shaft. E is a stationary breaker, set in an offset or space, $e$. These breakers are made in the shape of double cones or other similar form, the concavities of the movable ones being placed opposite to the convexities of the stationary ones, and vice versa.

The cream, mixture of cream and milk, or new milk, being poured into the chamber A and the top shut down, the churn is ready to produce its butter. As the shaft revolves the movable breakers throw the cream into the space $e$ under and against the stationary breaker E. This prevents the cream from being carried around the shaft, and rapidly breaks the globules which contain the butter. The butter having come, the buttermilk is drawn off at an outlet, $a$, the cover lifted, and cold water injected. The paddles and breakers now force the butter into space $e$, where they beat it until all the milk is withdrawn therefrom and deposited in the bottom of chamber A. This buttermilk is now drawn off, the shaft reversed, the butter forced down from cavity $e$, the shaft removed, and the operation completed.

I have, by practical experiment with a large churn, made butter from new milk in five minutes.

It will be observed, too, that the butter does not require to be touched with the hand.

Having thus described my invention, what I claim as new, and desire to secure by Letters Patent, is—

1. The combination of the movable breakers D, rigidly attached to a rotary shaft, with the stationary breaker E, located over a cavity, $e$, as and for the purpose described.

2. The combination of the paddles or butter-worker C, fixed obliquely to a rotary shaft, with a cavity, $e$, wherein the butter lodges while it is being beaten and the buttermilk worked therefrom.

3. As an article of manufacture, a churn, consisting of the cream-chamber A having cover A', outlet $a$, cavity $e$, and stationary breaker E, and the rotary shaft B having the movable breakers D and oblique butter-workers C rigidly attached thereto, all arranged to operate at the time and in the manner set forth.

To the above specification of my invention I have signed my hand this 25th day of March, A. D. 1872.

W. McKEEVER.

Witnesses:
SOLON C. KEMON,
THOS. D. D. OURAND.